United States Patent [19]

Helm

[11] 4,083,586
[45] Apr. 11, 1978

[54] TUBE COUPLING

[75] Inventor: Homer E. Helm, Troy, Mich.

[73] Assignee: Gordon H. Cork, Birmingham, Mich.

[21] Appl. No.: 741,239

[22] Filed: Nov. 12, 1976

[51] Int. Cl.² ............... F16L 17/00; F16L 47/00
[52] U.S. Cl. .................. 285/323; 285/105; 285/321; 285/423
[58] Field of Search ............ 285/105, 104, 323, 321, 285/113, 423, 322

[56] References Cited

U.S. PATENT DOCUMENTS

| 1,726,808 | 9/1929 | Cox | 285/323 |
| 1,796,061 | 3/1931 | Swanson | 285/323 X |
| 3,635,501 | 1/1972 | Thorne-Thomsen | 285/321 |
| 3,743,326 | 7/1973 | Courtot et al. | 285/105 |
| 3,815,940 | 6/1974 | Luckenbill | 285/105 |
| 3,909,046 | 9/1975 | Legris | 285/323 X |
| 4,005,884 | 2/1977 | Drori | 285/323 |

FOREIGN PATENT DOCUMENTS

| 989,204 | 5/1951 | France | 285/341 |
| 2,404,092 | 7/1975 | Germany | 285/321 |
| 970,887 | 9/1964 | United Kingdom | 285/104 |

Primary Examiner—Thomas F. Callaghan
Attorney, Agent, or Firm—Barnes, Kisselle, Raisch & Choate

[57] ABSTRACT

A releasable tube coupling wherein the tube is retained in a coupling body by means of a resilient tube clamping sleeve which encircles the tube and has radially outwardly projecting detents thereon engaging radially outwardly extending apertures or recesses in the bore of the coupling body. The sleeve is circumferentially contractible to enable its insertion into the coupling body and for tightly clamping the tube. The sleeve is dimensioned to frictionally engage the outer surface of the tube and, when an axially outward force is applied to the tube, the detents are cammed inwardly to cause the sleeve to contract and tightly grip the tube.

14 Claims, 13 Drawing Figures

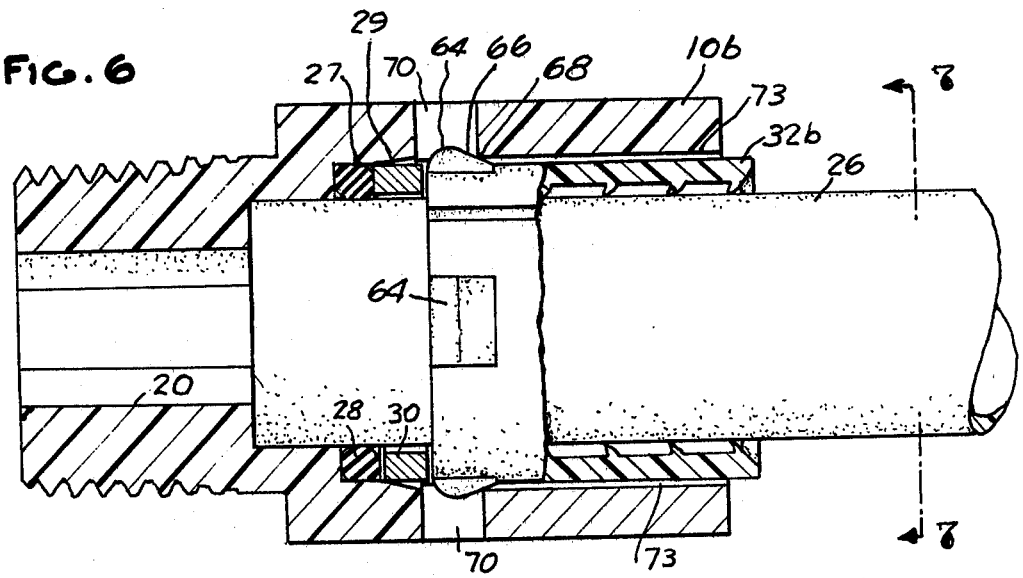
FIG. 6
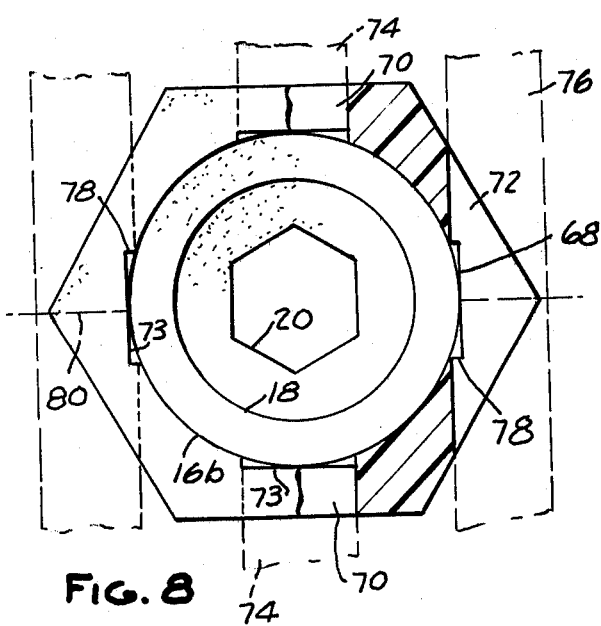
FIG. 8
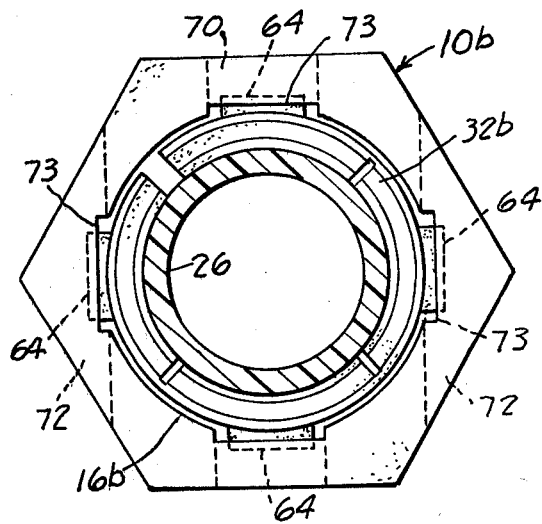
FIG. 7
FIG. 9

TUBE COUPLING

This invention relates to releasable fluid couplings for metal and at least semi-rigid plastic tubes.

In many industrial applications and consumer products metal or semi-rigid plastic tubing is employed for conducting fluids under pressure to and from fluid-operated devices. The tubing is connected to the supply source of the fluid and to the operated device by means of couplings. From the standpoint of operation it is important that the couplings are fluid-tight; from the standpoint of servicing it is important that the tubing is adapted to be easily and readily connected to and disconnected from the coupling.

It is an object of this invention to provide a coupling of the type described which meets the aforementioned practical requirements and which, at the same time, is designed so that it can be manufactured economically.

A further object of the present invention resides in the provision of a tube coupling which necessitates a minimum of parts, the parts being of a design ideal for plastic molding, or formed of metal very economically.

More specifically, the present invention contemplates a coupling which includes a body having a resilient tube clamping sleeve removably telescoped therein. The tube clamping sleeve is circumferentially contractible and has a plurality of radially outwardly projecting detents on the outer surface thereof. The detents on the sleeve engage in radially outwardly extending apertures or recesses formed from the bore to the exterior of the body in which the sleeve is telescoped. When telescoped into the body with its detents engaging the apertures, the sleeve is adapted to frictionally engage a tube inserted axially into the sleeve. The detents and apertures are interengaged and designed such that, when an outward pull is exerted on the tube in the coupling, the detents are cammed radially inwardly and cause the sleeve to tightly clamp the outer cylindrical surface of the tube. The apertures are shaped such that when the body is molded from plastic they can be formed by simple projections in the two halves of the molding die.

Other objects, features and advantages of the present invention will become apparent from the following description and accompanying drawings, in which:

FIG. 6 is a longitudinal sectional view of a second modified form of construction of tube coupling;

FIG. 7 is a sectional view taken along line 7—7 in FIG. 6;

FIG. 8 is a sectional view illustrating the manner in which the coupling body can be molded from plastic;

FIG. 9 is an end view of the tube clamping sleeve illustrated in FIG. 6;

Figure 1:
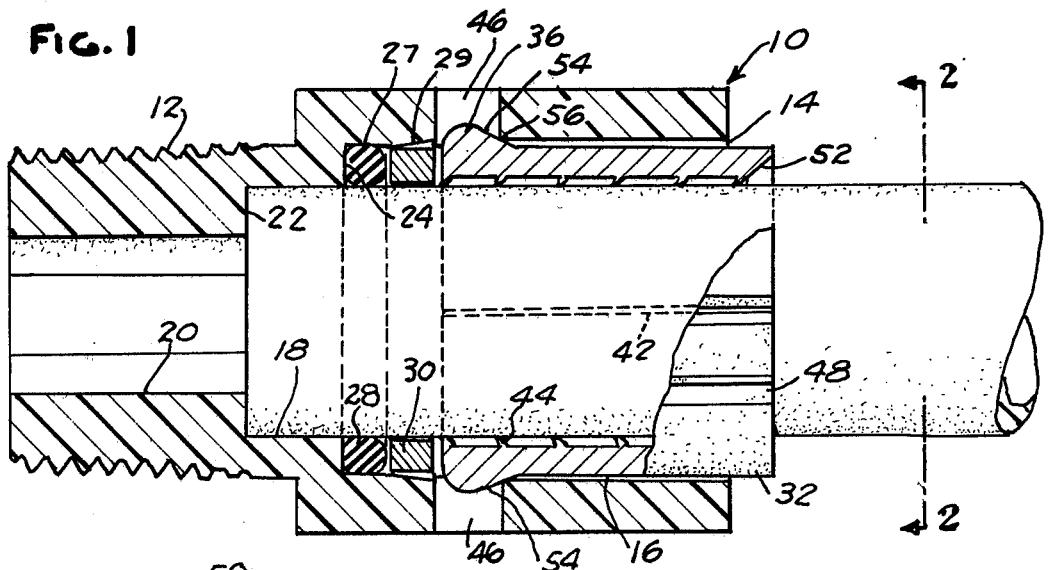
FIG. 1 is a longitudinal sectional view of a tube coupling embodying the present invention.
Figure 2:
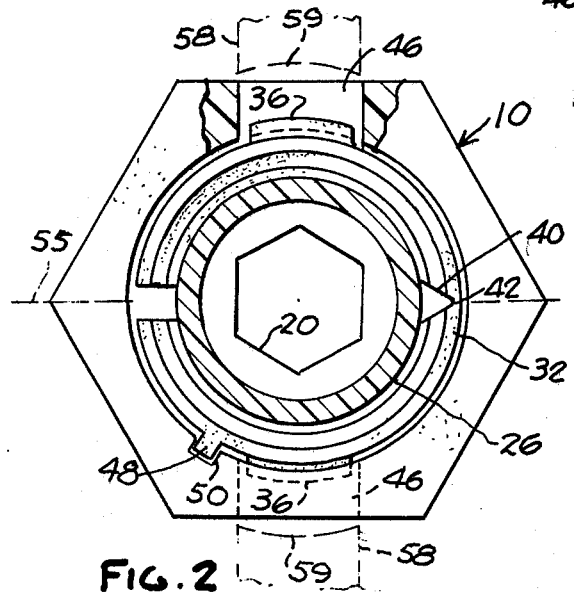
FIG. 2 is a sectional view along line 2—2 in FIG. 1.
Figure 3:
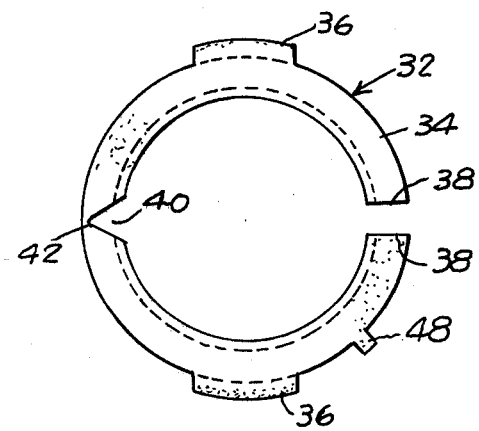
FIG. 3 is an end view of the tube clamping sleeve illustrated in FIG. 1.

Referring first to FIGS. 1 through 3, the tube coupling includes a body 10, preferably formed of plastic, having a threaded portion 12 at one end by means of which the coupling is adapted to be connected to a fluid-operated device or a fluid power source. Adjacent threaded portion 12 the outer periphery of body 10 may be of hexagonal shape as shown in FIG. 2 to facilitate rotating the coupling body. Body 10 is centrally bored as at 14. Bore 14 comprises three sections 16,18,20 of progressively decreasing diameter. The intermediate section 18 is connected with the smaller bore section 20 by means of an annular inwardly extending shoulder 22 and is connected with the larger bore section 16 by an annular radially outwardly extending shoulder 24. In the embodiment illustrated in FIGS. 1 and 2 bore section 20 may be of hexagonal shape of facilitate the interengagement thereof with a wrench for turning the coupling body, particularly if the coupling body is of circular cross section. In the embodiment illustrated in FIG. 4 bore 20a is of circular shape in cross section.

The tube adapted to be used with the coupling is designated 26 and is formed of metal or of plastic that is at least semi-rigid so that it will not collapse readily. Bore 18 has a diameter such as to freely receive the end of tube 26. An O-ring 28 formed of rubber or other elastomer is located in bore 16 adjacent shoulder 24 and embraces the outer surface of tube 26 so as to provide a sealed connection therewith. O-ring 28 is located between shoulder 24 and a circumferentially continuous ring 30. Bore 16 is ensmalled slightly adjacent shoulder 24 to provide a cylindrical land 27 which forms a seat for O-ring 28 and which is connected with bore section 16 by a conical surface 29 which prevents damage to O-ring 28. O-ring 28 may be replaced by any other type of suitable seal.

Tube 26 is adapted to be releasably locked in coupling body 10 by means of a resilient tube clamping sleeve 32. Sleeve 32 is preferably molded from plastic in one piece. It has a cylindrical outer surface 34 provided with a pair of diametrically opposed detents 36 at one end thereof. Detents 36 project radially outwardly from the outer cylindrical surface of the sleeve. As shown in FIG. 3, sleeve 32 is of circular cross section and has circumferentially spaced parted ends 38 at one side thereof extending throughout the length of the sleeve. At a point diametrically opposite the parted ends 38 the inner periphery of the sleeve is formed with a longitudinally extending V-shaped notch 40 which forms a hinge 42. The material from which sleeve 32 is formed is at least slightly resilient so that it normally assumes the shape illustrated in FIG. 3. The internal cylindrical surface of the sleeve is formed with a plurality of thin annular ribs 44 which are slightly inclined toward the end of the sleeve on which detents 36 are formed. When sleeve 32 is formed of a plastic material ribs 44 are relatively rigid so as to firmly grip tube 26.

Sleeve 32 is retained in body 10 by means of a pair of diametrically opposite apertures or recesses 46 in body 10 with which detents 36 are adapted to interengage as shown in FIG. 1. The outer diameter of sleeve 32 in the relaxed position thereof is preferable slightly smaller than the diameter of bore section 16 in body 10. The parted ends 38 are spaced apart circumferentially to enable the sleeve to be circumferentially contracted sufficiently to reduce the diameter of the sleeve at the detents 36 to enable telescoping of the sleeve into bore section 16 so as to interengage the detents 36 with apertures 46. In order to properly orient sleeve 32 so that detents 36 will register axially with apertures 46, the outer surface of the sleeve may be provided with a longitudinally extending key 48 engageable in a longitudinal slot 50 in bore section 16. The internal diameter of sleeve 32 is dimensioned such that when the sleeve is inserted in the body to the position illustrated in FIG. 1 ribs 44 are adapted to frictionally engage the outer surface of and retain tube 26 which is telescoped therein. The outer end of sleeve 32 is beveled as at 50 to facilitate insertion of the tube into the slightly undersized bore of sleeve 32. Sleeve 32 is dimensioned in length so that it projects outwardly beyond the end of body 10 when the detents 36 are engaged in apertures 46. Detents 36 are fashioned with inclined cam surfaces 54 which engage the edges 56 of apertures 46 when the sleeve is assembled with body 10.

In practice the coupling is shipped to the customer with sleeve 32, ring 30 and O-ring 28 assembled in body 10 in the manner illustrated in FIG. 1. The coupling may then be used by the customer by simply telescoping the proper sized tube 26 into sleeve 32 so that it will be at least initially frictionally retained thereby. When fluid under pressure is directed into the coupling, O-ring 28 is normally displaced axially in a direction toward the right as viewed in FIG. 1 and thus causes ring 30 to be pressed against the inner end of sleeve 32. If the pressure of the fluid is sufficient to cause at least slight displacement of sleeve 32 in a direction toward the right, the interengagement of edges 56 with cam surfaces 54 of detents 36 causes the sleeve to circumferentially contract around and tightly engage the tube. Likewise, in the same manner, any outward pull on tube 26 will tend to tighten the sleeve around the tube. If it is desired to remove the tube from the coupling it is only necessary to engage the outer end of sleeve 32 manually or with a suitable tool and force the sleeve in a direction axially inwardly of the coupling. This relieves the clamping force and permits sleeve 32 to expand sufficiently to enable the tube to be pulled out of the sleeve.

One of the features of the present invention resides in the fact that apertures 46 are diametrically opposed. If body 10 is molded from plastic these apertures can be formed very simply and inexpensively by a pair of diametrically opposed blade-like projections located one in each of the separable halves of the molding die. The molding die would have a parting line which would extend horizontally through the central axial plane 57 of body 10 as viewed in FIG. 2. The inner confronting ends of the projections in the die (shown in phanthom in FIG. 2 and designated 58) would be curved as at 59 to mate with the outer cylindrical surface of the core pin in the die for forming bore section 16.

Figure 4:
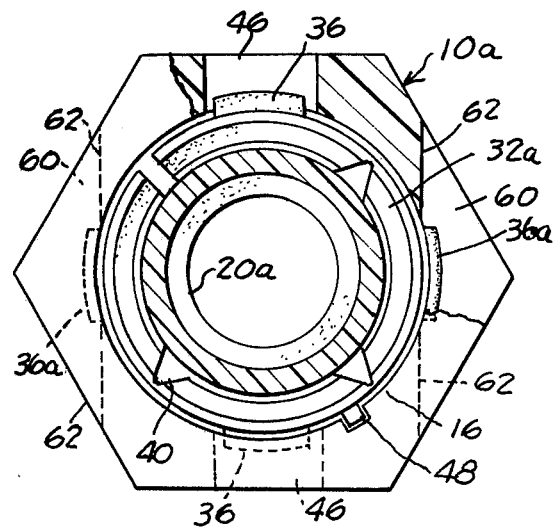
FIG. 4 is a view similar to FIG. 2 and showing a modified construction.
Figure 5:
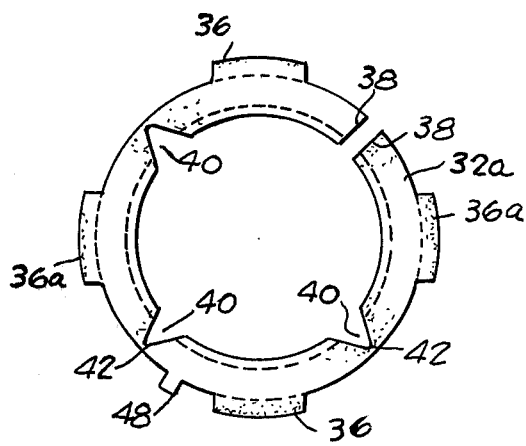
FIG. 5 is an end view of the tube clamping sleeve illustrated in FIG. 4.

The embodiment illustrated in FIGS. 4 and 5 differs from that shown in FIGS. 1 through 3 primarily in that sleeve 32a is provided with an additional pair of diametrically opposed detents 36a having the same configuration as detents 36 and which are spaced 90° circumferentially therefrom. Sleeve 32a has three V-shaped notches 40. Thus, the sleeve 32a is divided by notches 40 and the parted ends 38 into four contiguous circular segments, each of which is formed on the outer surface thereof with a detent of the described configuration. To accommodate the detents 36a, body 10a is formed with an additional pair of diametrically opposed apertures 60. To facilitate molding body 10a from a plastic material, each aperture 60 is formed as a straight slot extending transversely through the body on diametrically opposite sides thereof. The bottoms 62 of slots 60 are parallel to the central axis of apertures 46 and intersect bore section 16 as shown in FIG. 4. Slots 60 lie in the same plane as apertures 46 and are perpendicular to the central axis of bore section 16.

The embodiment illustrated in FIGS. 6 through 9 differs only slightly from that shown in FIGS. 4 and 5. In the arrangement shown in FIGS. 4 and 5 the radially outermost edges of detents 36,36a are of arcuate shape as viewed from the end of the sleeve and the edges of apertures 46,60 engaged by the detents are also of arcuate shape. In the event it is desired to form the detents on the sleeve and the apertures in the body so as to present straight (rather than arcuate) shoulders, the arrangement illustrated in FIGS. 6 through 9 may be employed. In this arrangement the two pair of diametrically opposite detents 64 on sleeve 32b have radially inclined cam surfaces 66 which are flat (rather than curved) and cooperate to define segments of a truncated cone of square cross section. Likewise, the edges 68 of apertures 70,72 are also defined by straight lines forming segments of the four sides of a square.

In the event it is desired to mold body 10b shown in FIGS. 6 through 8 from plastic, the central core pin in the die for molding bore section 16b would preferably have four radially outwardly projecting flat ribs thereon which form flat longitudinal grooves 73 in bore section 16b (FIG. 8). Two diametrically opposed projections 74, one on each of the separable havles of the molding die, would cooperate with two of the flat ribs to form apertures 70. The other two apertures 72 would each be formed by two opposed projections 76 in the die extending parallel to projections 74 and having shallow rectangular notches 78 on the radially inner faces thereof mating with the other two flat ribs on the central core pin which form the edges of apertures 72. The molding die would have a parting line at 80 extending through the center of the coupling body perpendicular to the axis of the diametrically opposed openings 70.

The assembly and operation of the coupling illustrated in FIGS. 6 through 9 is substantially the same as the coupling illustrated in FIGS. 4 and 5, the primary difference being that the flat faces 66 on detents 64 engage the square shoulders 68 of apertures 70,72. In assemblying sleeve 32b in bore 16b detents 64 are first axially aligned with grooves 73. The sleeve is then contracted slightly and inserted through bore 16b to interengage detents 64 with the respective apertures 70,72 in the body.

Figure 10:
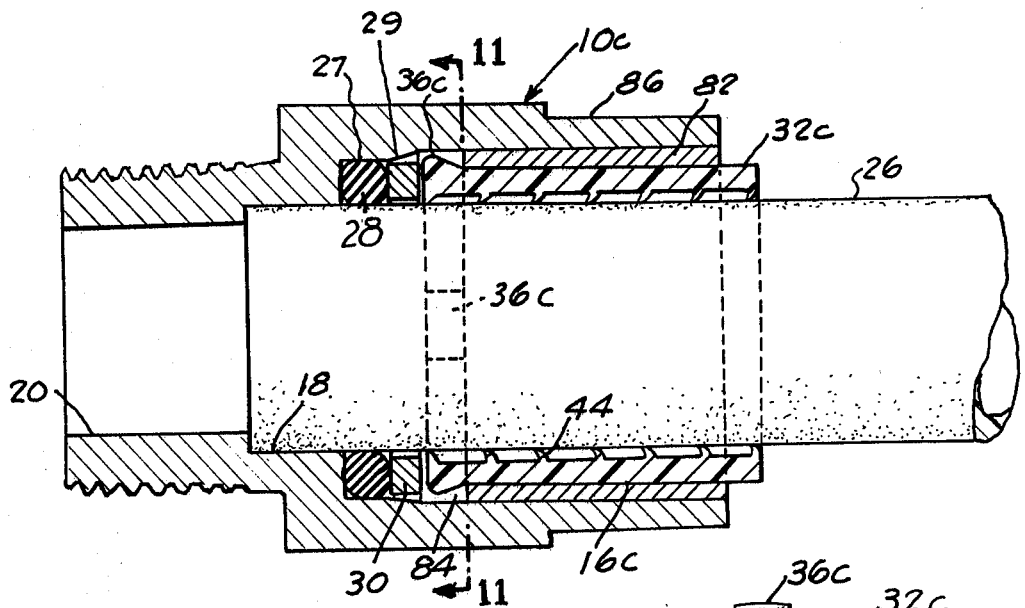
FIG. 10 is a longitudinal sectional view of a further variation of tube coupling embodying the present invention.

In the arrangement illustrated in FIGS. 10 through 13 the tube clamping sleeve 32c is substantially the same as sleeve 32a illustrated in FIGS. 4 and 5, except for a slight difference in the configuration of the notches 40c which form the hinge sections 42c. Also, in view of the manner in which the sleeve in this embodiment operates, there is no need to provide the key 48 on the outer surface thereof. Body 10c has a bushing 82 press-fitted or otherwise fixedly secured in the larger bore portion 16c. As shown in FIG. 10, bushing 82 is substantially shorter in length than bore section 16c so that the inner end of bushing 82 cooperates with ring 30 to define an annular recess 84 within body 10. Recess 84 forms a circular groove between the inner end of bushing 82 and ring 30 into which the detents 36c are adapted to project. Groove 84 cooperates with detents 36c in the same manner as apertures 46,60 in the embodiment illustrated in FIG. 4 cooperate with detents 36,36a. In other words, sleeve 32c is adapted to be circumferentially contracted to enable its insertion through bushing 82 to locate detents 36c in groove 84.

Figure 11:
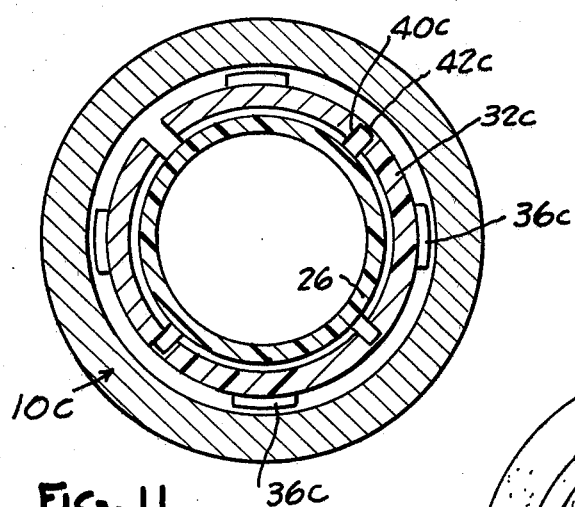
FIG. 11 is a sectional view along line 11—11 in FIG. 10.
Figure 13:
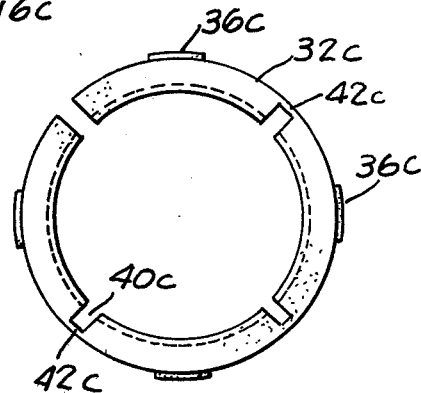
FIG. 13 is an end view of the tube clamping sleeve shown in FIG. 10.
Figure 12:
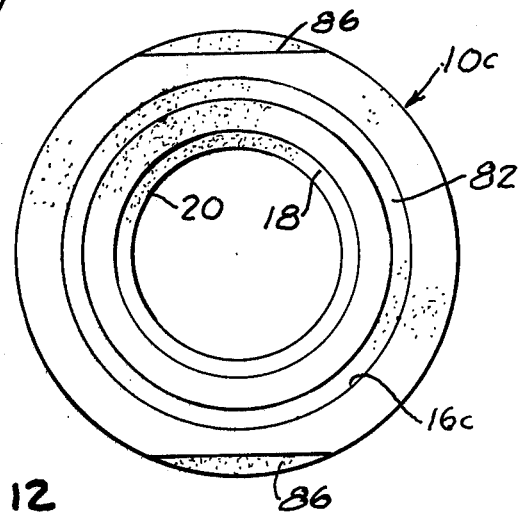
FIG. 12 is an end view of the coupling body shown in FIG. 10.

When tube 26 is initially inserted through sleeve 32c to the position illustrated in FIG. 11 it is at least frictionally engaged and retained in the coupling body by ribs 44 in sleeve 32c. Thereafter, when an axial outward force is applied to tube 26 (such as when the tube is pulled outwardly or when pressure fluid is admitted to the coupling), the sleeve is further contracted circumferentially by the interengagement of the cam faces of detents 36c with the inner end of bushing 82 to firmly and tightly clamp the tube in the coupling.

The arrangement shown in FIGS. 10 through 13 is admirably suited to a coupling construction where body 10c is formed of metal since bushing 82 provides the desired groove 84 without requiring any expensive machining operations in the bore of the body. If desired, body 10c can be formed with a pair of diametrically opposite flats 86 to facilitate rotating the coupling for connection or removal from a fluid-operated device.

It will be appreciated that the invention is not only applicable to the straight coupling illustrated but to numerous other types of couplings, such as tees, elbows, crosses, etc., and even multiple outlet fittings.

I claim:

1. A releasable tube coupling comprising, a body having a small cylindrical bore at one end and a coaxial, smooth large cylindrical bore at its opposite end, the inner end of the large bore terminating at a radially inwardly extending shoulder at the junction of the two bores, said large bore having an open end for receiving the tube, a molded plastic resilient cylindrical sleeve in said large bore into which the tube is adapted to be telescoped, said sleeve having a plurality of radially outwardly extending detents on the outer surface thereof, said body having radially outwardly extending recesses in said large bore spaced axially from said open end thereof and into which said detents project, the circle defined by the radially outermost edges of said detents normally having a diameter larger than said large bore, said sleeve being split longitudinally throughout its length so as to provide a pair of circumferentially spaced parted edges which enable the sleeve to be resiliently collapsed circumferentially to reduce the diameter thereof at said detents to at least the diameter of said large bore to enable axial insertion of the sleeve into said large bore through said open end and to permit the sleeve to expand when the detents register axially with said recesses to thereby interengage said detents with the recesses, said detents and recesses having interengaged cam surfaces which tend to circumferentially contract the sleeve into tight clamping engagement with the outer surface of a tube inserted therethrough in response to an axial outward force applied to the tube, said sleeve projecting outwardly beyond said open end of the large bore when the detents are engaged in said recesses, said sleeve being shiftable axially inwardly of said large bore to relieve its clamping action on the tube to enable withdrawal of the tube from within the sleeve.

2. A coupling as called for in claim 1 wherein said large bore is defined by a cylindrical bushing telescoped into an enlarged bore in said body, said bushing being fixed in said enlarged bore and having an inner end terminating within said bore at a plane spaced from said shoulder, said recesses being defined at least in part by the inner end of said bushing.

3. A coupling as called for in claim 2 wherein said recesses are defined by the annular space between said shoulder and the inner end of said bushing.

4. A coupling as called for in claim 1 wherein the surfaces of said detents engaging the surfaces of said recesses are inclined radially inwardly in a direction toward the open end of said large bore and said surfaces of said recesses comprise shoulders perpendicular to the axis of said bores.

5. A coupling as called for in claim 1 wherein said sleeve has at least one axially extending groove on the inside thereof which provides a portion of reduced thickness spaced circumferentially from said parted edges to facilitate circumferential contraction thereof.

6. A coupling as called for in claim 5 wherein said portion of reduced thickness has a radial extent substantially less than the depth of said groove and is disposed diametrically opposite said parted edges and said detents are symmetrically disposed circumferentially relative to said parted edges.

7. A coupling as called for in claim 1 wherein said sleeve has a plurality of axially extending grooves on the inside thereof which provide portions of reduced thickness which are circumferentially spaced at regular intervals from said parted edges, said portions of reduced thickness having a radial extent substantially less than said grooves and cooperating with said parted ends to divide the sleeve into a plurality of circumferentially contiguous segments which are hingedly connected by said portions of reduced thickness and which are readily flexible relative to each other, each of said segments having a detent located on the outer surface thereof.

8. A coupling as called for in claim 1 wherein said recesses comprise apertures extending radially outwardly from said large bore to the outer surface of said body.

9. A coupling as called for in claim 8 wherein said large bore has a plurality of longitudinal grooves therein extending from said apertures to said open end of the large bore, the bottoms of said grooves defining a circle of smaller diameter than the circle defined by the outermost surfaces of the detents when the sleeve is in the relaxed condition, said grooves being spaced circumferentially to correspond with the circumferential spacing of said detents and being adapted to slideably receive said detents when the sleeve is circumferentially contracted.

10. A coupling as called for in claim 9 wherein the radially outermost edge of each detent and the line of intersection between each aperture and the bottom of the associated groove extend along a generally straight line perpendicular to an axial plane extending through the axis of said large bore and the center of the aperture.

11. A coupling as called for in claim 8 wherein said body comprises a plastic molding, said apertures being diametrically opposed and having a central axis perpendicular to the axis of said bores.

12. A coupling as called for in claim 11 wherein said apertures have generally straight side walls parallel to the central axis thereof.

13. A coupling as called for in claim 8 wherein said body comprises a plastic molding, each aperture having a central axis extending radially of said large bore, said aperture axes being spaced 90° apart circumferentially and lying in generally the same radial plane, two of the diametrically opposed apertures being defined by radial passageways, each forming a through hole in said body intersecting said large bore, the other two apertures being defined by a pair of straight slots on diametrically opposite sides of the body extending parallel to the axes of said through openings and intersecting said large bore.

14. A coupling as called for in claim 13 wherein said large bore has four rectangularly shaped grooves extending lengthwise therein, each aligned with and intersecting a corresponding one of said apertures to define a square shoulder at the junction of said grooves and apertures, the cam surfaces of said detents comprising generally flat surfaces inclined to the central axis of said sleeve and engaging said square shoulders in substantially straight line contact.

* * * * *